(12) United States Patent
Bertin et al.

(10) Patent No.: US 7,535,380 B2
(45) Date of Patent: May 19, 2009

(54) OPTICAL DEVICE FOR INDICATING THE GLIDE ANGLE FOR AIRCRAFT

(75) Inventors: Daniele Maria Bertin, Calderara di Reno (IT); Laura De Maria, Calderara di Reno (IT)

(73) Assignee: Calzoni S.r.l., Calderara Di Reno (Bologna) (IT)

( * ) Notice: Subject to any disclaimer, the term of this patent is extended or adjusted under 35 U.S.C. 154(b) by 95 days.

(21) Appl. No.: 11/011,528

(22) Filed: Dec. 7, 2004

(65) Prior Publication Data

US 2006/0119839 A1    Jun. 8, 2006

(30) Foreign Application Priority Data

Dec. 22, 2003    (IT)    .......................... MI2003A2565

(51) Int. Cl.
*G08G 1/095* (2006.01)
(52) U.S. Cl. .................. 340/907; 340/945; 340/948; 340/981
(58) Field of Classification Search ............. 356/139.03; 340/947–948, 951–956, 907–932
See application file for complete search history.

(56) References Cited

U.S. PATENT DOCUMENTS

| | | | | |
|---|---|---|---|---|
| 4,856,896 A | * | 8/1989 | Farr | 356/153 |
| 5,022,739 A | * | 6/1991 | Bennett et al. | 359/529 |
| 5,287,104 A | | 2/1994 | Shemwell | 340/952 |
| 5,550,604 A | * | 8/1996 | Gale et al. | 353/31 |
| 5,991,011 A | * | 11/1999 | Damm | 356/5.01 |
| 6,028,535 A | * | 2/2000 | Rizkin | 340/953 |
| 6,239,725 B1 | | 5/2001 | Bray | 340/953 |
| 6,320,516 B1 | * | 11/2001 | Reason | 340/953 |
| 6,483,106 B1 | * | 11/2002 | Ohtomo et al. | 250/236 |
| 6,812,045 B1 | * | 11/2004 | Nikoonahad et al. | 438/14 |
| 6,920,295 B2 | * | 7/2005 | Yoshimura et al. | 399/81 |
| 2001/0036341 A1 | * | 11/2001 | Ohtsuka et al. | 385/78 |
| 2002/0039291 A1 | * | 4/2002 | Kohno | 362/257 |
| 2002/0136027 A1 | * | 9/2002 | Hansler et al. | 362/559 |
| 2002/0191175 A1 | * | 12/2002 | Coombs et al. | 356/71 |
| 2003/0167345 A1 | * | 9/2003 | Knight et al. | 709/249 |
| 2003/0219202 A1 | * | 11/2003 | Loeb et al. | 385/33 |
| 2004/0129794 A1 | * | 7/2004 | Deichmann et al. | 239/17 |
| 2004/0228144 A1 | * | 11/2004 | Squicciarini | 362/555 |

FOREIGN PATENT DOCUMENTS

WO    WO 00/56603    9/2000    ................... 533/99

* cited by examiner

*Primary Examiner*—Thomas H Tarcza
*Assistant Examiner*—Timothy A Brainard
(74) *Attorney, Agent, or Firm*—Timothy J. Klima

(57) ABSTRACT

Optical device for indicating the glide angle for aircraft, comprising at least one unit (10) for generating a light ray with a predefined colour, at least one unit (20) for transmitting said light ray and creating a light image, and at least one unit (30) for remotely projecting said light image, characterized in that said generating unit (10) comprises at least one light source consisting of an LED (11) and said unit (20) for transmitting the light ray and creating a light image is of the optical fibre type (21, 22).

23 Claims, 1 Drawing Sheet

OPTICAL DEVICE FOR INDICATING THE GLIDE ANGLE FOR AIRCRAFT

The present invention relates to an optical device for indicating the glide angle for aircraft.

In the technical sector relating to guide signals for aircraft, the luminous devices able to indicate a predefined glide angle to helicopters/airplanes in order to allow the latter to perform a correct approach manoeuvre towards the decking/landing surface are known.

It is also known that these devices of the known type use incandescent or halogen lamps which have a short working life and whose luminous power rapidly deteriorates over time.

In addition to this, the known light sources emit a white light which must be divided into differently coloured sectors arranged alongside each other in a vertical plane so as to define different glide angles with respect to a direction parallel to the decking/landing surface; this division is obtained by arranging a filter between the light source and a light projector; in view of the characteristics of the white light emitted, these filters are however characterized by a very limited efficiency especially in the "red" sector, and consequently the light actually emitted and useful for recognition by the pilot is in turn very poor.

In addition to this the light generated by the known devices is not compatible with the night-time viewing glasses which are worn by pilots who are unable to recognise the colours clearly and consequently the light rays must be passed through other filters which reduce further the luminosity which can be detected and/or must be frequency-modulated in order to allow identification thereof.

Since there is only one light source, it is also necessary, in order to obtain frequency-modulation of the top and bottom light sectors, to insert mechanical motorized baffles (obturators) which obscure the sectors with the required frequency. This results in corresponding problems relating to the precision and cost of manufacture of the movable components, the reliability and duration of the said components over time, and the positioning precision.

The technical problem which is posed therefore is that of providing an optical device for indicating the glide angle for aircraft during decking/landing, which:

is able to ensure projection of a light beam, optionally divided into differently coloured sectors which have a high luminosity and duration over time and are also directly compatible with the night-time viewing equipment used by the pilots;

does not require auxiliary filters with a high absorption capacity for the colours of the various sectors of a signalling beam; and produces signalling light beams able to be discerned by the human observer in a uniform manner without perception of the structure of the emission means and/or the zones of different intensity and chromatic effect with partial superimposition of the colours.

Within the context of this problem it is also required that this device should have limited dimensions, be easy and inexpensive to produce and install also on conventional platforms already installed for example on-board ships.

These results are obtained according to the present invention by an optical device for indicating the glide angle for aircraft, comprising at least one unit for generating a light ray with a predefined colour, at least one unit for transmitting said light ray and creating a light image, and at least one unit for remotely projecting said light image, said generating unit comprising at least one light source consisting of an LED and said unit for transmitting the light ray and creating a light image being of the optical fibre type.

The present patent relates furthermore to a method for generating a light beam indicating the glide angle for aircraft according to the characteristic features of claim 17.

Further details may be obtained from the following description of a non-limiting example of embodiment of the subject of the present invention, provided with reference to the accompanying drawings in which.

Figure 1:
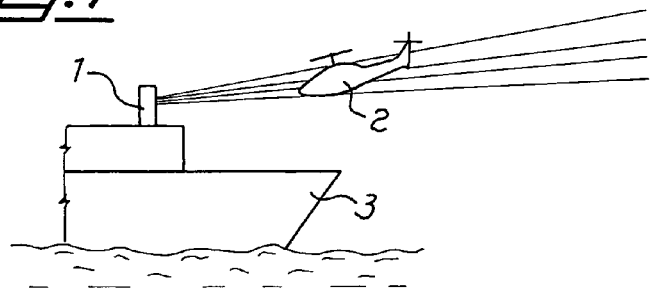
FIG. 1 is a schematic view of a ship equipped with an optical device indicating the glide angle for aircraft according to the present invention.
Figure 2:
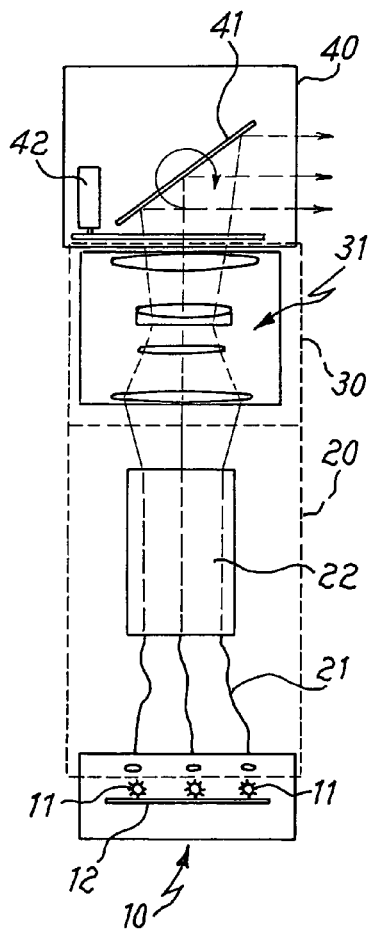
FIG. 2 is a schematic representation of the device according to FIG. 1.
Figure 3:
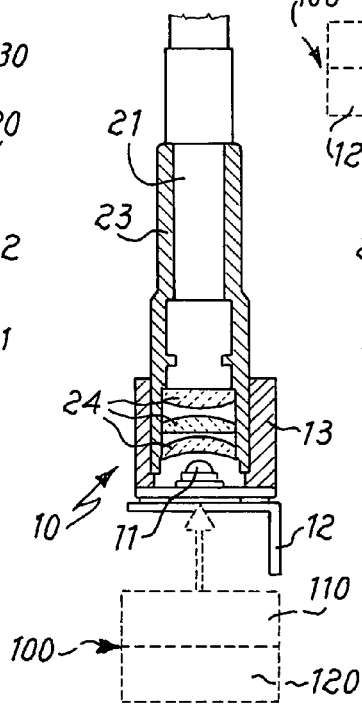
FIG. 3 is a schematic cross-section through the detail of the connection between the optical fibre and the light source.

As shown, the device 1 according to the present invention for indicating the glide angle to a helicopter 2 when landing on a ship 3 essentially consists of:

a unit 10 for emitting light rays;

a unit 20 for transmitting the light rays emitted by the emission unit and for creating an image to be projected;

a unit 30 for remotely projecting the said image in the form of a beam with predefined optical characteristics;

a unit 40 for directing the light beam emitted by the projection unit 30.

In greater detail, the generating unit 10 envisages at least one light source 11 of the LED (light emitting diode) type for each colour present in the beam to be projected; said source is mechanically constrained to a support flange 12 to which there is also coaxially constrained a guide sleeve 13 for connecting a light guide 20 which is essentially formed by bundles of optical fibres divided up into:

a first section 21 consisting of flexible leads to be joined to the individual LEDs by means of an associated jack 23 suitable for connection to the said sleeve 13 and provided with a set of focussing lenses 24;

a second boxed section 22 at the end of which opposite to that of the leads the light image to be projected is formed.

Said LEDs are powered by means of a suitable unit 100 equipped with associated devices 110 able to provide the electric power supply with the programmed intensity.

In the example illustrated and for the specific object described for which it is envisaged that the landing angle is identified by three different colour sectors : Yellow (=high), Green (=aligned) and Red (=low), respectively, three groups of LEDs 11 are envisaged, one for each colour required by the beam, connected to a respective flexible optical-fibre lead 21 which conveys the respective coloured beam to the boxed part 22 inside which the fibres are intertwined and arranged so as to form the image to be projected.

By means of said image transmission and formation unit 20, the said image is sent to the projection unit 30 comprising associated projecting optics 31 which are essentially conventional and designed to project remotely the image present at the end of the boxed part 22 in the form of a light beam having predefined optical focussing and angular opening characteristics.

The projected light beam then encounters the unit 40 for directing the light beams, which comprises a mirror 41 able to rotate the said light beam by means of associated controlled actuating devices 42 which are conventional per se and therefore not described in detail; by means of said directable mirror, the projected beam may therefore be directed at different angles of inclination with respect to the decking/landing surface.

In a preferred embodiment the optical fibres associated with the LEDs of a same colour are intertwined by means of a special combing process, which is conventional per se, in order to ensure that the light sector is homogeneous; in addition to this, the fibres of adjacent sectors, which are intertwined as described above, are joined together in order to obtain the emission, on the lens side, of a rectangular image divided into three differently coloured sectors of suitable dimensions and with a well-defined associated dividing line.

The light beams emitted may also be frequency-modulated by the power supply unit 100 which has devices 120 able to cause switching on and off, with a predefined frequency, of the light source 11 corresponding to the specific colour of a sector of the light beam.

This ensures that the light beams of the various sectors are compatible with the night-time viewing equipment used by the pilots, without the need for mechanical obturators.

It is therefore clear how with the optical device indicating the glide angle for aircraft according to the invention it is possible to obtain light beams having a high intensity and duration over time, while ensuring limited dimensions of the projection optics and reduced loss of luminosity during transmission of the light beam from the source to the lens.

Owing to the particular intertwined arrangement of the optical fibres forming part of the same LED and between the LEDs of a same group or colour, it may be ensured that each sector of the light beam has a uniform intensity and colour without interference from the structure of the transmission means, typically associated with the devices of the known art.

In addition to this, the light beams emitted are compatible with the night-time viewing equipment of the pilot owing to the frequency-modulation of different coloured sectors.

Although described with regard to an embodiment complete with a mirror 40 for directing the beams, it is envisaged that, for particular applications, the device may also be installed without the said mirror. In addition to this it is envisaged that, where mechanically possible, the connection between the projection unit 40 and the light source 11 may be performed with the boxed optical-fibre part 22 alone and without the flexible part 21.

Figure 4:
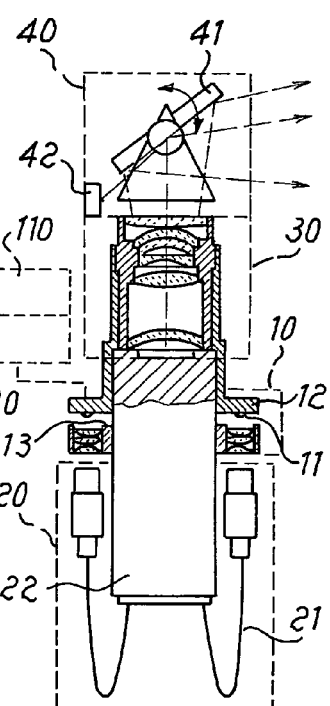
FIG. 4 is a schematic cross-section through a second example of embodiment of the device according to the present invention.

FIG. 4 shows a second example of embodiment of the device according to the present invention for which the same reference numbers have been maintained.

The invention claimed is:

1. An optical device for indicating a glide angle for an aircraft, comprising:
    at least one unit for generating a plurality of light rays of different predefined colors,
    at least one unit for transmitting the light rays and creating a single light image, and
    at least one unit for remotely projecting the single light image,
    wherein the unit for generating a plurality of light rays comprises a plurality of LED light sources for generating the light rays of different predefined colors and the unit for transmitting the light rays and creating a single light image comprises at least one section of optical fibers arranged to combine the light rays into the single light image in a manner such that the single light image includes a plurality of distinct color zones, each zone having a generally uniform color the same as one of the predefined colors and each zone having a color different from at least one of the other zones, each zone visually indicating a range of glide angle for the aircraft.

2. The optical device according to claim 1, wherein the device comprises a plurality of LED light sources for each differently colored ray.

3. The optical device according to claim 1, and further comprising a support flange for mechanically constraining the LED light sources.

4. The optical device according to claim 3, and further comprising a guide sleeve for connection to the unit for transmitting, the guide sleeve being coaxially constrained to the support flange.

5. The optical device according to claim 4, wherein the unit for transmitting further comprises one end having a jack for connection to said the guide sleeve for guiding the LED light sources.

6. The optical device according to claim 1, and further comprising a variable electrical power supply unit for powering the unit for generating a plurality of light rays with a programmed intensity.

7. The optical device according to claim 6, wherein the power supply unit includes a switching unit switching at least some of the LED light sources on and off with a predefined frequency.

8. The optical device according to claim 7, wherein the predefined frequency is a modulation frequency that is predefined in accordance with the specific color of one of the zones.

9. The optical device according to claim 1, and further comprising a set of focusing lenses associated with the jack.

10. The optical device according to claim 1, wherein the unit for transmitting comprises at least one section of flexible optical fiber.

11. The optical device according to claim 1, wherein the unit for transmitting comprises at least one section of boxed optical fibers for ensuring the formation of the single light image at an end opposite to that end for connection to the light source.

12. The optical device according to claim 1, wherein the optical fibers are intertwined so as to form the single light image with a uniform distribution of luminosity of the LED light sources.

13. The optical device according to claim 1, wherein the unit for remotely projecting comprises associated projection optics for remotely projecting the single light image as a light beam.

14. The optical device according to claim 1, and further comprising a unit for directing the single light image from the unit for remotely projecting.

15. The optical device according to claim 14, wherein unit for directing comprises a movable mirror and a mirror actuating device for controlling movement of the mirror.

16. The optical device according to claim 1, wherein the plurality of distinct color zones are in the form of a plurality of horizontally arranged color layers.

17. A method for generating a light signal for indicating a glide angle for aircraft, comprising:
    generating a plurality of light rays of different predefined colors;
    transmitting the light rays and creating a single light image to be projected;
    remotely projecting the single light image;
    generating the light rays of different predefined colors with a plurality of LED light sources; and transmitting the light rays and creating the single light image with at least one section of optical fibers arranged to combine the light rays into the single light image in a manner such that the single light image includes a plurality of distinct color zones, each zone having a generally uniform color the same as one of the predefined colors and each zone having a color different from at least one of the other zones, each zone visually indicating a range of glide angle for the aircraft.

18. The method according to claim 17, and further comprising joining the optical fibers together in a longitudinal direction to form the distinct color zones.

19. The method according to claim 17, and further comprising frequency modulating at least a portion of the LED light sources.

20. The method according to claim 19, wherein the frequency modulating comprises switching the LED light sources on and off with a predefined frequency.

21. The method according to claim 20, and further comprising predefining the predefined frequency in accordance with a specific color of the light ray emitted by the associated LED light source.

22. The method according to claim 17, and further comprising directing the remote projection to vary an angle of the single light image with respect to a decking/landing surface for the aircraft.

23. The method according to claim 17, wherein the plurality of distinct color zones are in the form of a plurality of horizontally arranged color layers.

* * * * *